US005884481A

United States Patent [19]

Johansson et al.

[11] Patent Number: 5,884,481

[45] Date of Patent: Mar. 23, 1999

[54] HEAT ENGINE HEATER ASSEMBLY

[75] Inventors: Lennart N. Johansson; Nicholas R. Marchionna; Stephen C. Matthews; Benjamin Ziph, all of Ann Arbor, Mich.

[73] Assignee: STM Corporation, Ann Arbor, Mich.

[21] Appl. No.: 892,368

[22] Filed: Jul. 14, 1997

[51] Int. Cl.[6] .............................. F01B 29/10; B60K 16/00

[52] U.S. Cl. .............................. 60/517; 60/524; 60/525; 60/526; 60/641.8; 60/641.15

[58] Field of Search .............................. 60/517, 524, 526, 60/525, 520, 641.8, 641.13, 641.14, 519, 641.15

[56] References Cited

U.S. PATENT DOCUMENTS

| | | | |
|---|---|---|---|
| 1,951,403 | 3/1934 | Goddard . | |
| 3,942,324 | 3/1976 | Johansson et al. | 60/517 |
| 3,991,457 | 11/1976 | Barton . | |
| 4,195,554 | 4/1980 | Rosenqvist . | |
| 4,236,383 | 12/1980 | Selcuk | 60/641.14 |
| 4,345,645 | 8/1982 | Bratt | 165/176 |
| 4,395,879 | 8/1983 | Berntell | 60/517 |
| 4,422,291 | 12/1983 | Berntell | 60/517 |
| 4,528,978 | 7/1985 | Robinson . | |
| 4,602,614 | 7/1986 | Percival et al. . | |
| 4,625,514 | 12/1986 | Tanaka et al. | 60/517 |
| 4,633,667 | 1/1987 | Watanabe et al. | 60/517 |
| 4,639,212 | 1/1987 | Watanabe et al. | 431/183 |
| 4,665,700 | 5/1987 | Bratt | 60/517 |
| 4,715,183 | 12/1987 | Meijer et al. | 60/524 |
| 4,821,516 | 4/1989 | Isshiki | 60/517 |
| 4,894,989 | 1/1990 | Mizuno et al. | 60/517 |
| 5,113,659 | 5/1992 | Baker et al. | 60/641.8 |
| 5,203,170 | 4/1993 | Naito | 60/524 |
| 5,228,293 | 7/1993 | Vitale | 60/641.14 |
| 5,404,723 | 4/1995 | Parker et al. | 60/641.15 |
| 5,787,712 | 8/1998 | Fukui et al. | 62/6 |

FOREIGN PATENT DOCUMENTS

| | | | |
|---|---|---|---|
| 31 04 689 A1 | 8/1982 | Germany | 60/641.8 |

OTHER PUBLICATIONS

*Mirror on the Sun*, Jet Propulsion Laboratory, Superintendent of Documents, U.S. Government Printing Office, Washington, D.C. 20402, Oct., 1980.

*Solar Energy International Company, Ltd.* SEIC, Ltd, Mar. 1996.

*Primary Examiner*—Ira S. Lazarus
*Assistant Examiner*—Ljiljana V. Ciric
*Attorney, Agent, or Firm*—Harness, Dickey & Pierce P.L.C.

[57] ABSTRACT

A heater assembly for a heat engine designed to utilize solar energy and heat produced by combustion of a fuel such as natural gas. A receiver housing allows concentrated solar energy to be directed through a receiver aperture into a receiver chamber. Inner and outer arrays of heater tubes within the receiver chamber absorb the solar energy and transfer heat to working fluid in the heater tubes. A burner within the housing produces combustion gases which circulate past the heater tubes and transfer heat to the working fluid. The heater tubes form an opaque surface to solar energy and have uniform gaps which allow heated fluid to be passed between adjacent heater tubes. A precise three-dimensional mathematical description for the centerlines of the heater tubes which maintains uniform gaps between adjacent heater tubes is disclosed.

19 Claims, 3 Drawing Sheets

HEAT ENGINE HEATER ASSEMBLY

BACKGROUND AND SUMMARY OF THE INVENTION

This invention is related to a heater assembly for a heat engine designed to utilize heat from two distinctly different energy sources and particularly to a heater assembly for a heat engine designed to utilize both solar energy and heat produced by combustion of a fuel such as natural gas.

Heat engines, such as Stirling cycle engines, are capable of converting heat in a working fluid to mechanical output energy. Heat engines are typically coupled to an electrical generator, which converts the mechanical output energy into electricity, or to a device that utilizes the mechanical output energy, such as an irrigation pump or manufacturing equipment. Heater assemblies are the components of heat engines used to transfer heat from an external heat source, such as the sun or a fuel combustor, to an internal working fluid circulating within the heat engine, such as helium or hydrogen. The working fluid undergoes a thermodynamic cycle within the heat engine that converts a portion of the heat energy in the working fluid into mechanical output energy.

One primary application for heat engines is the conversion of solar energy into electricity. In these applications, the heat engine is typically coupled with a solar concentrator and an electrical generator. The solar concentrator is generally a parabolic dish covered with a reflective material, such as glass mirrors, which reflect incident solar radiation and focus this energy toward an energy receptor, which is typically located inside a receiver chamber of a heater assembly attached to the heat engine. The heater assembly typically includes a receiver housing, which forms the receiver chamber and has a receiver aperture or opening which allows the inside of the receiver chamber to be insolated, i.e. exposed to the solar radiation reflected by the solar concentrator. An array of heater tubes attached to the heat engine are located within the receiver chamber and the working fluid circulates through them. The heater tubes absorb the solar radiation and increase the temperature of the working fluid, which is then circulated into the other components of the heat engine where this heat energy is converted into mechanical energy.

A great deal of commercial interest has been expressed in developing large fields of solar powered electrical generators to supply additional quantities of electricity needed during peak electrical demand periods. Peak demand periods for electrical service typically occur during daylight hours during the summer, due in large part to the electrical demands of air conditioning equipment. Because it is during these periods when solar powered electrical generators are typically able to generate maximum quantities of electricity, solar powered electrical generators offer a unique source of electricity for utility companies trying to plan for these fluctuations in electrical service demand.

Utility companies are interested in being environmentally sensitive by using sources of renewable energy, such as solar energy, and reducing the generation of pollutants associated with typical fossil fuel and nuclear power electrical generation systems. They are also interested in reducing the costs associated with constructing, operating and eventually dismantling additional nuclear or fossil fuel powered electricity generating facilities. Fuel costs, particularly the costs of petroleum-based fossil fuels such as fuel oil, have widely fluctuated in the past and utility companies are interested in developing sources of energy that are less subject to these price fluctuations. Fields of solar concentrators combined with Stirling cycle engines connected to electrical generators are currently being evaluated for these types of electricity generation applications.

A significant problem with the vast majority of solar powered electrical generation systems, however, is that they are powered solely by solar energy and solar energy is inherently intermittent. Solar collectors incorporating photovoltaic cell technology, for instance, are unable to utilize any source of energy other than solar energy to produce electricity. Solar energy is inherently intermittent because it is both periodic, because of the diurnal day/night cycle, and random, because of sporadic and often protracted cloudiness that is found virtually everywhere on earth. Even the sunniest areas of the southwest U.S., such as Death Valley, Calif., have an average cloudiness of approximately twenty percent, and this cloudiness can persist for several days in a row. Solar powered electrical generation systems are generally inoperable during these persistently cloudy, overcast periods. Because the total solar energy reaching the ground on a cloudy, overcast day may be one tenth or less of the solar energy reaching the ground on an clear day with no haze or smog, the electricity produced by any type of electricity generating solar collector will depend, in significant part, on the cloudiness of the region the solar collector is installed in. Utility companies and other entities utilizing solar collectors to collect solar energy must therefore constantly factor in a large degree of uncertainty regarding the availability of the power from these systems as well as prepare for the possibility of receiving no power at all from these systems for periods of up to several days in a row.

In addition, extreme weather conditions and maintenance requirements reduce the operating efficiency of typical solar energy collection systems. Thunderstorms, hail, wind blown debris, and high winds can seriously damage solar collection systems. To prevent this type of damage, solar collectors may be inactivated during extreme weather conditions, such as by covering the solar concentrator or rotating the concentrator into a downward facing stowed position. When cleaning or repairing the reflecting surface of a solar concentrator during daylight hours, the concentrator will typically be pointed away from the sun to reduce the possibility of injuring a maintenance worker or damaging the equipment.

To compensate for these fluctuations in power output, many operators of solar powered electrical generation equipment have installed separate fossil-fuel fired backup generation systems or costly, complex and inefficient heat storage systems. The cost and complexity of installing and operating these types of alternative power generation or heat storage systems have significantly reduced the commercial viability of many types of solar powered electrical generation systems.

The inventive heat engine heater assembly has been designed to utilize concentrated solar energy when this energy is available, and to utilize heat produced by combustion of a fuel, such as natural gas, when solar energy is not available. In this way, the hybrid powered electrical generation system is available to produce electricity during cloudy periods, at night, during periods of extreme weather and while maintenance is being performed on the solar concentrator. The inventive heater assembly has been designed to allow the heat engine to be rapidly changed from being solar powered to being combustion powered, and vice versa.

Stirling cycle engines are the primary type of heat engine being evaluated for commercial solar powered electrical generation systems. Stirling cycle engines offer very high thermal efficiency as well as long service free lives. The heat engine used in connection with the inventive heater assembly could include Stirling cycle engine designs and components previously developed by the Assignee of the present invention, Stirling Thermal Motors, Inc., including those described in U.S. Pat. Nos. 4,707,990; 4,715,183; 4,785,633; and 4,911,144, which are hereby incorporated herein by reference.

In contrast to most internal combustion engines, heat engines are typically able to utilize heat from a variety of sources and are not particularly sensitive to the quality of the heat provided. In many cases, the only change required to change heat sources for a heat engine is to install a heater assembly that has been optimized for that particular type of heat source. The internal components of the heat engine may be identical or extremely similar for a wide spectrum of alternative heat sources.

The inventive heater assembly, however, eliminates the need to replace the heater assembly when changing heat sources from solar energy to fuel combustion and vice versa because the heater assembly has been designed to utilize both sources of heat.

The heater assembly incorporates inner and outer heater tube arrays, a receiver housing having a receiver cavity and forming a receiver aperture which allows the receiver cavity to be insolated, a cover for sealing off the receiver aperture, a fuel combustor and a preheater which warms the intake air with heat from the exhaust gases.

The heater tubes arrays are positioned in nested pair of inner and outer arrays that have modified inverted conical frustrum shapes. The individual heater tubes are twisted or swirled in such a manner that identical gaps are maintained between adjacent heater tubes throughout their runs. The inner array of heater tubes connects a number of cylinder extension manifolds to a number of heater tube heads. The outer array of heater tubes connect the heater tube heads to a number of regenerator housing manifolds. Separate heater tubes extend between a cylinder extension manifold and a heater tube head and between a heater tube head and a regenerator housing manifold. Passageways in the heater tube head allow working fluid to flow from the cylinder extension manifold, through the inner array of heater tubes, through the heater tube head, through the outer array of heater tubes and enter the regenerator housing manifold, and vice versa. In the double acting Stirling cycle engine embodiment of the heat engine described herein, the working fluid is constantly shuttled back and forth between the cylinder extension manifolds and the regenerator housing manifolds as the engine operates.

A common design problem associated with the design of a heater assembly for a Stirling cycle engine or other heat engine is how to arrange a plurality of heater tubes emanating from a smaller inner circle of a given radius, $r_o$, and going to a circle of larger radius, $r_f$, so that the gap between adjacent tubes is uniform throughout their run. In a direct flame heater head, the uniformity of the gap is important for to obtain desirable external heat transfer characteristics. It is desirable to heat the heater tubes and associated components as evenly as possible to reduce the formation of expansion stresses on the components that can lead to component failures. For a direct-illumination solar receiver, it is advantageous to maintain line contact between adjacent tubes over their entire effective length. This line contact relationship allows a maximum amount of energy to be received for any given set of heater tubes.

When the base circle and the final circle are on the same plane, a constant gap can be obtained by tubes whose centerlines form involutes. Involutes are plane curves formed by the paths of equally spaced points on a line tangent to the root circle as the line is rolled without slip on the circle. A problem arises, however, when there is an axial separation between the base circle and the final circle. When the plane involutes are projected onto an axially symmetric surface between the two circles, say a conical frustrum, the projections are space-curves with gaps between adjacent curves which are, in general, not uniform.

A one-parameter family of axially symmetric surfaces is disclosed herein upon which the space-curves which are projections of plane involutes maintain a uniform gap. These space-curves are particular projections of plane involutes onto a conical frustrum which maintain a uniform gap between adjacent curves.

The inventive heater assembly incorporates a pair of these novel heater tube arrays that are nested closely together to provide an opaque surface to solar radiation. Each member of the outer array of heater tubes is centered within the gap between adjacent members of the inner array of heater tubes when viewed from the central axis of the heater tube arrays. In this way, uniform gaps are also obtained between each member of the outer array and the two closest members of the inner array, thereby further enhancing the heat transfer characteristics of the array when operating in the combustion mode. In addition, the members of the outer array have apparent areas which are the same or larger than the apparent areas of the gaps between adjacent members of the inner array when viewed from the central axis of the heater tube arrays. In this way, the receiver tube arrays present an opaque surface to solar radiation, thereby enhancing the heat transfer characteristics of the array when operating in the solar energy mode and reducing the "dead" area caused when a member of the inner heater tube array shades a member of the outer heater tube array.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
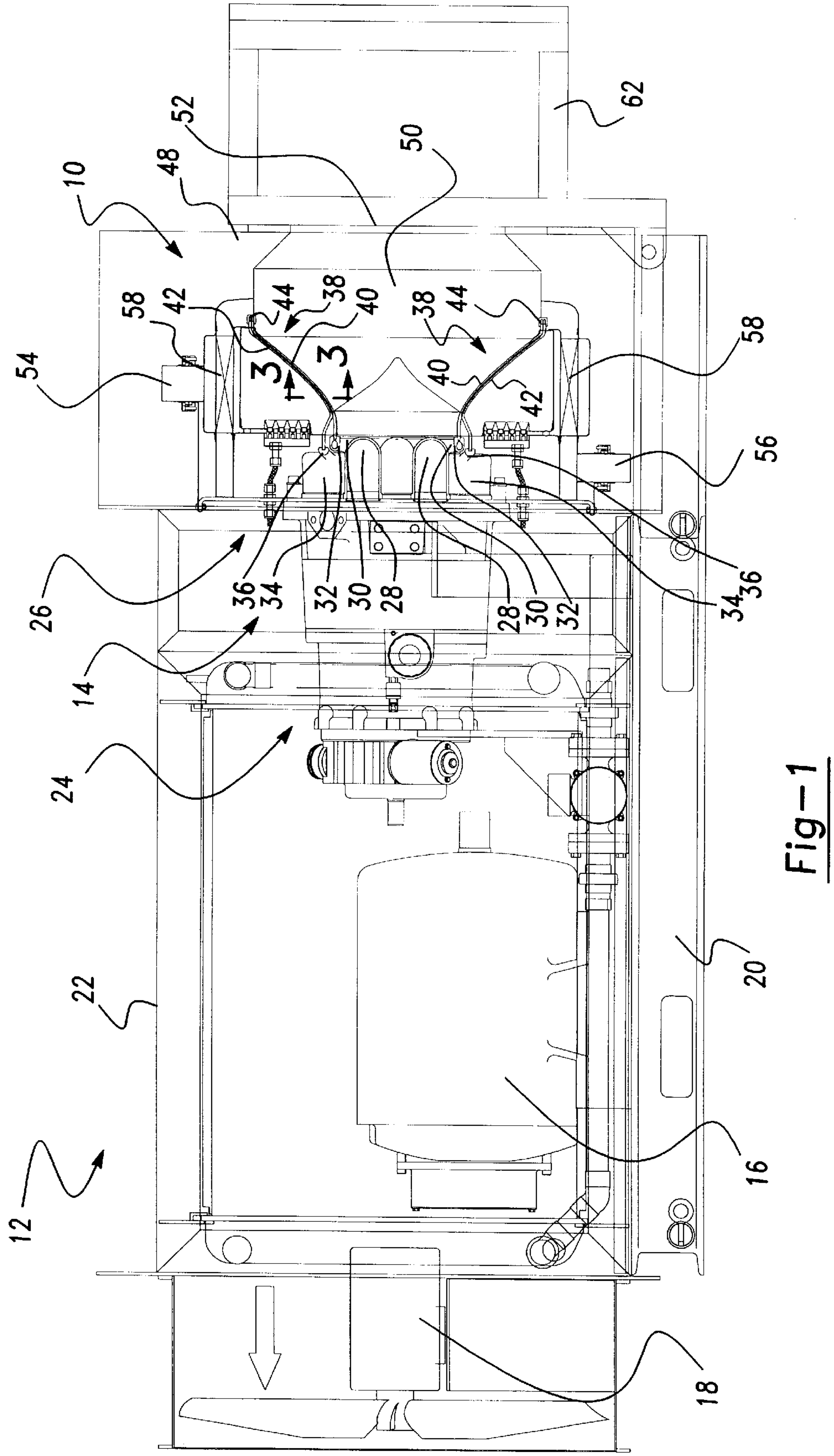
FIG. 1 is a longitudinal partial cross-sectional view through a heat engine heater assembly in accordance with this invention incorporated within a mobile electrical generation unit.

A heat engine heater assembly in accordance with this invention is shown in FIG. 1 and is generally designated by reference number 10. In FIG. 1, heater assembly 10 has been depicted installed as part of a hybrid powered electrical generation unit 12. Other major components of electrical generation unit 12 include heat engine 14, generator 16, fan 18, skid 20, and unit housing 22.

Heat is transferred to working fluid circulating within heat engine 14 by heater assembly 10. The heat energy in the working fluid is converted to mechanical output energy by the components of heat engine 14. The heat engine 14 is mechanically coupled to generator 16 which converts the mechanical output energy from the heat engine to electricity. Skid 20 and unit housing 22 are used, respectively, to support and contain electrical generation unit 12. Fan 18 creates the airflow required to properly operate and cool heat engine 14 and generator 16.

Heat engine 14 includes a number of primary components and assemblies including drive case assembly 24 and cylinder block assembly 26. Drive case assembly 24 contains the components required to convert the reciprocating motion of the pistons into rotational motion on the output shaft. Cylinder block assembly 26 includes cylinders 28, cylinder extensions 30, cylinder extension manifolds 32, regenerator housings 34, and regenerator housing manifolds 36. Pistons reciprocating within cylinders 28 in response to a working fluid pressure differential across the pistons converts heat energy to mechanical output energy which is then conveyed through the components of drive case assembly 24 to the output shaft.

As will be discussed in detail below, heater assembly 10 includes heater tube assembly 38 which consists of inner heater tubes 40, outer heater tubes 42, and heater tube heads 44. Inner heater tubes 40 are connected to cylinder extension manifolds 32 and heater tube heads 44. Outer heater tubes 42 are connected to heater tube heads 44 and regenerator housing manifolds 36. Working fluid is shuttled back and forth between cylinders 28 and regenerator housing 34 as heat engine 14 runs, and the temperature of the working fluid is raised as it passes through inner heater tubes 40 and outer heater tubes 42. Heater assembly 10 also includes cone 46 and receiver housing 48, which forms a receiver chamber 50, in which heater tube assembly 38 is located, and receiver aperture 52 through which receiver chamber 50 can be insolated. Heater assembly 10 further includes air intake 54, air exhaust 56, heat exchanger 58, and burner 60. Burner 60 is also referred to as a fuel combustor. The final major component of heater assembly 10 is aperture cover 62, which shown as being pivotally mounted to unit housing 22.

Heat engine 14 has two operating modes. In the "solar" operating mode, aperture cover 62 is rotated away from receiver aperture 52 and a solar concentrator (not shown) is used to insolate, i.e. directly subject to solar radiation, the interior of receiver chamber 50 with concentrated solar energy. This solar energy is received by heater tube assembly 38 and raises the temperature of the working fluid circulating within the heater tube assembly. In the "combustion" mode, aperture cover 62 is rotated into contact with receiver aperture 52 where it seals off the opening. Burner 60 is activated which begins the combustion of a fuel such as natural gas. The combustion gases are directed through the gaps between heater tubes 40 and 42, which raises the temperature of the working fluid circulating within the heater tubes. Heat exchanger 58 warms the intake air with heat from the exhaust air after the exhaust air has passed through the gaps between heater tubes 40 and 42.

Figure 2:
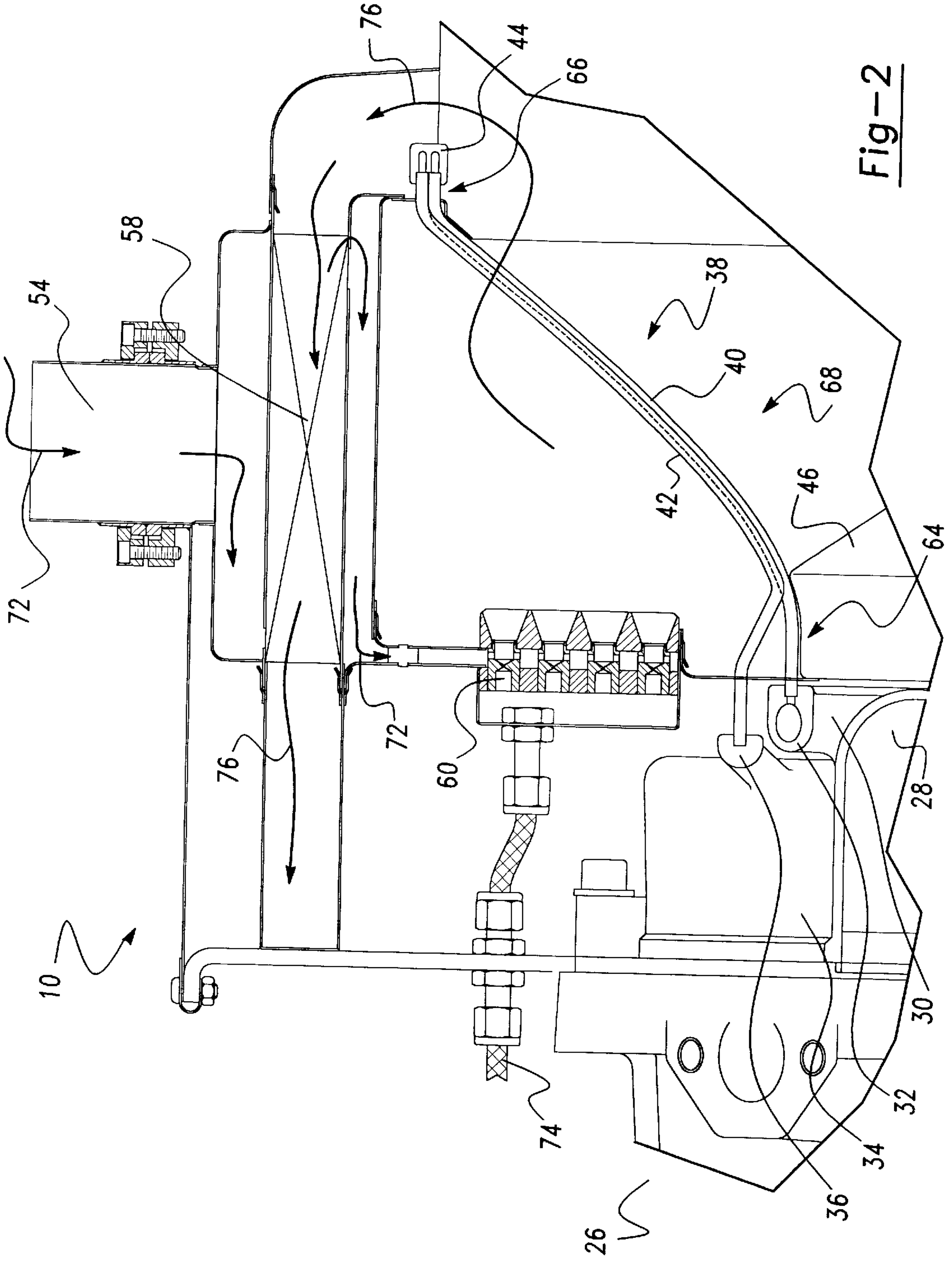
FIG. 2 is an enlarged cross-sectional view of a portion of the heater assembly from FIG. 1, particularly showing the airflow of the heater assembly in the combustion mode.

As best shown in FIG. 2, each heater tube 40 and 42 has three portions, manifold portion 64, head portion 66 and central portion 68. Manifold portions 64 allow heater tubes 40 and 42 to be attached to cylinder extension manifolds 32 and regenerator housing manifolds 36, which typically comprise inner and outer circular planar surfaces, respectively. Head portions 66 allow heater tubes 40 and 42 to be attached to heater tube heads 44, which also typically comprise a circular planar surface. In an alternative embodiment of heater tube assembly 38, heater tube heads 44 are eliminated and the head portions 66 of heater tubes 40 and 42 consist of loop portions joining a pair of central portions 68. In this embodiment, one inner heater tube 40 and one outer heater tube 42 can be fabricated from a single piece of tubing.

The purpose of heater tube assembly 38 is to transfer heat to working fluid circulating within heater tubes 40 and 42. The manifold portions 64 of heater tubes 40 and 42 have been designed to allow the heater tubes to be connected to the cylinder extension manifolds 32 and the regenerator housing manifolds 36, respectively. The head portions 66 of heater tubes 40 and 42 have been designed to allow the heater tubes to be connected to heater tube heads 44. The central portions 68 of heater tubes 40 and 42 have been specifically designed to provide optimal heat transfer characteristics under both solar insolation and combustion conditions.

Figure 3:
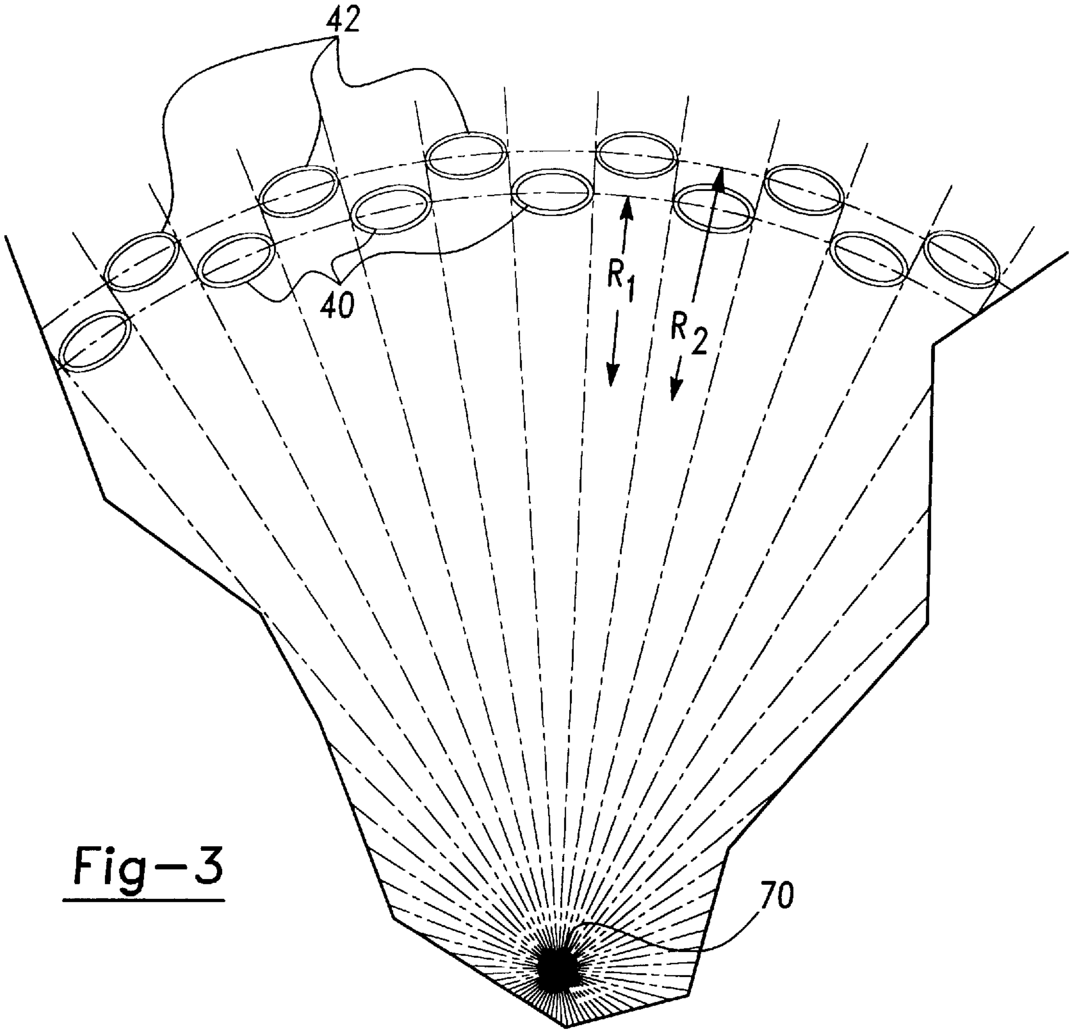
FIG. 3 is a cross-sectional view of the heater tube arrays from FIG. 1, particularly showing the nested relationship between the members of the inner and outer arrays of heater tubes.

The nested relationship of the central portions 68 of heater tubes 40 and 42 are best shown in cross section in FIG. 3. When viewed in cross section, the central portions 68 of the inner heater tubes 40 are equally spaced about a circle of a certain radius, designated as $R_1$, and the central portions 68 of the outer heater tubes 42 are equally spaced about a circle of another radius, designated as $R_2$. As shown in FIG. 2, $R_2$ is larger than $R_1$. While inner heater tubes 40 and outer heater tubes 42 are typically cylindrical in cross section, they are oval when viewed in this particular cross section because they are inclined with respect to the central axis 70 of heater tube assembly 38.

It will be obvious to those skilled in the art that the spacing between adjacent members of the inner array and the outer array can be modified by increasing or decreasing the distance $R_2$–$R_1$ and by increasing or decreasing the spacing between adjacent members of the inner array with respect to one another (and correspondingly increasing or decreasing the spacing between the members of the outer array with respect to one another). The optimal tubes spacing will depend, in part, on the diameter of heater tubes 40 and 42, the level of energy flux in the vicinity of heater tubes 40 and 42, as well as the type and velocity of the fluid passing within the heater tubes. It would also be possible to add a third or more heater tube arrays to heater assembly 10.

To maintain optimal operating efficiency when operating in the "solar" mode, it is important that the members of the outer array have an apparent area greater than or equal to the apparent area of the gap between the two closest members of the inner array when viewed from the central axis 70 of the heater tube arrays. The members of the inner and outer arrays thereby form a surface which is opaque when viewed from the central axis 70 (and thereby collects the maximum amount of solar energy).

Applicants have developed a precise mathematical description of the tube centerlines which assures that the spacing between adjacent tubes in a given array remain constant throughout their run. By maintaining this constant spacing between adjacent members of a given array and by positioning the members of the outer array between and slightly behind adjacent members of the inner array, Applicants have succeeded in developing a heater tube configuration which appears opaque to solar radiation, yet also has uniform gaps between adjacent tube members throughout their three dimensional runs which allows the tube array to be effectively used in the "combustion" mode.

The central portions 68 of each heater tube array can be viewed as a modified inverted conical frustrum, with the smaller base circle having a radius $r_o$, the larger final circle having a radius $r_f$, and the two circles having an axial separation $z_f$. The independent variable, radius r, varies between $r_o$ and $r_f$. This surface must be regarded as a "modified" conical frustrum because the walls of the surface are flared and are not precisely linear.

The other variables used to describe the tube centerlines are as follows:

$k=z_f/(r_f^2-r_o^2)^{1/2}$ $\psi=((r/r_o)^2\cdot(k^2+1)-1)$ $\theta_{ini}$=Initial radial coordinate of each tube centerline The initial radial coordinate of each tube centerline will consist of evenly spaced angular locations that allow a discrete number of heater tubes to be arranged about the periphery of the base circle with equal spacing between the heater tubes.

In cylindrical coordinates, the tube centerline curve can be mathematically defined as:

$\theta(r)=\psi-k-\tan^{-1}\psi+\tan^{-1}k+\theta_{ini}$ (or equivalently $\theta(r)=\psi-k-\tan^{-1}((\psi-k)/(1+\psi\cdot k))+\theta_{ini}$); and $z(r)=k\cdot(r^2-r_o^2)^{1/2}$ In Cartesian coordinates, the tube centerline curves can be equivalently defined as:

$x(r)=r\cdot\cos(\theta(r))$;

$y(r)=r\cdot\sin(\theta(r))$; and $z(r)=k\cdot(r^2-r_o^2)^{1/2}$

Table 1 contains calculated values for a demonstrative heater tube centerline when the base circle radius is 65, the final circle radius is 140, the axial separation is 50 and $\theta_{ini}=\theta$. In this case, the calculated slope-constant k=0.403239 and the cylindrical and Cartesian coordinates of the demonstrative tube centerline are as follows:

TABLE 1

| r | ψ | θ | x | y | z |
|---|---|---|---|---|---|
| 65.0 | 0.403 | 0.0000 | 65.00 | 0.00 | 0.00 |
| 66.0 | 0.446 | 0.0065 | 66.00 | 0.43 | 4.62 |
| 67.0 | 0.485 | 0.0135 | 66.99 | 0.90 | 6.55 |
| 68.0 | 0.522 | 0.0209 | 67.99 | 1.42 | 8.05 |
| 69.0 | 0.557 | 0.0288 | 68.97 | 1.99 | 9.34 |
| 70.0 | 0.590 | 0.0371 | 69.95 | 2.59 | 10.48 |
| 71.0 | 0.622 | 0.0457 | 70.93 | 3.24 | 11.52 |
| 72.0 | 0.653 | 0.0546 | 71.89 | 3.93 | 12.49 |
| 73.0 | 0.683 | 0.0638 | 72.85 | 4.65 | 13.40 |
| 74.0 | 0.712 | 0.0733 | 73.80 | 5.42 | 14.26 |
| 75.0 | 0.740 | 0.0830 | 74.74 | 6.22 | 15.09 |
| 76.0 | 0.768 | 0.0930 | 75.67 | 7.06 | 15.88 |
| 77.0 | 0.795 | 0.1032 | 76.59 | 7.94 | 16.65 |
| 78.0 | 0.821 | 0.1137 | 77.50 | 8.85 | 17.39 |
| 79.0 | 0.847 | 0.1243 | 78.39 | 9.79 | 18.11 |
| 80.0 | 0.872 | 0.1351 | 79.27 | 10.78 | 18.81 |
| 81.0 | 0.897 | 0.1461 | 80.14 | 11.79 | 19.49 |
| 82.0 | 0.922 | 0.1573 | 80.99 | 12.84 | 20.16 |
| 83.0 | 0.946 | 0.1686 | 81.82 | 13.93 | 20.81 |
| 84.0 | 0.970 | 0.1801 | 82.64 | 15.04 | 21.46 |
| 85.0 | 0.994 | 0.1917 | 83.44 | 16.19 | 22.09 |
| 86.0 | 1.017 | 0.2035 | 84.23 | 17.38 | 22.71 |
| 87.0 | 1.041 | 0.2153 | 84.99 | 18.59 | 23.32 |
| 88.0 | 1.063 | 0.2274 | 85.74 | 19.84 | 23.92 |
| 89.0 | 1.086 | 0.2395 | 86.46 | 21.11 | 24.51 |
| 90.0 | 1.109 | 0.2518 | 87.16 | 22.42 | 25.10 |
| 91.0 | 1.131 | 0.2641 | 87.84 | 23.76 | 25.68 |
| 92.0 | 1.153 | 0.2766 | 88.50 | 25.13 | 26.25 |
| 93.0 | 1.175 | 0.2892 | 89.14 | 26.52 | 26.82 |
| 94.0 | 1.196 | 0.3019 | 89.75 | 27.95 | 27.38 |
| 95.0 | 1.218 | 0.3147 | 90.34 | 29.40 | 27.94 |
| 96.0 | 1.239 | 0.3275 | 90.90 | 30.88 | 28.49 |
| 97.0 | 1.261 | 0.3405 | 91.43 | 32.39 | 29.03 |
| 98.0 | 1.282 | 0.3535 | 91.94 | 33.93 | 29.57 |
| 99.0 | 1.303 | 0.3666 | 92.42 | 35.49 | 30.11 |

TABLE 1-continued

| r | ψ | θ | x | y | z |
|---|---|---|---|---|---|
| 100.0 | 1.324 | 0.3798 | 92.87 | 37.08 | 30.64 |
| 101.0 | 1.344 | 0.3931 | 93.30 | 38.69 | 31.17 |
| 102.0 | 1.365 | 0.4065 | 93.69 | 40.33 | 31.70 |
| 103.0 | 1.385 | 0.4199 | 94.05 | 41.99 | 32.22 |
| 104.0 | 1.406 | 0.4334 | 94.39 | 43.67 | 32.74 |
| 105.0 | 1.426 | 0.4469 | 94.69 | 45.38 | 33.25 |
| 106.0 | 1.446 | 0.4605 | 94.96 | 47.11 | 33.76 |
| 107.0 | 1.466 | 0.4742 | 95.19 | 48.86 | 34.27 |
| 108.0 | 1.486 | 0.4879 | 95.40 | 50.63 | 34.78 |
| 109.0 | 1.506 | 0.5017 | 95.57 | 52.42 | 35.28 |
| 110.0 | 1.526 | 0.5156 | 95.70 | 54.23 | 35.78 |
| 111.0 | 1.546 | 0.5295 | 95.80 | 56.06 | 36.28 |
| 112.0 | 1.566 | 0.5434 | 95.87 | 57.91 | 36.78 |
| 113.0 | 1.585 | 0.5574 | 95.89 | 59.78 | 37.27 |
| 114.0 | 1.605 | 0.5715 | 95.89 | 61.66 | 37.76 |
| 115.0 | 1.625 | 0.5856 | 95.84 | 63.56 | 38.25 |
| 116.0 | 1.644 | 0.5997 | 95.76 | 65.47 | 38.74 |
| 117.0 | 1.663 | 0.6139 | 95.63 | 67.40 | 39.23 |
| 118.0 | 1.683 | 0.6282 | 95.47 | 69.34 | 39.71 |
| 119.0 | 1.702 | 0.6425 | 95.27 | 71.30 | 40.19 |
| 120.0 | 1.721 | 0.6568 | 95.04 | 73.27 | 40.68 |
| 121.0 | 1.740 | 0.6711 | 94.76 | 75.25 | 41.15 |
| 122.0 | 1.759 | 0.6855 | 94.44 | 77.24 | 41.63 |
| 123.0 | 1.779 | 0.7000 | 94.08 | 79.24 | 42.11 |
| 124.0 | 1.798 | 0.7145 | 93.68 | 81.25 | 42.58 |
| 125.0 | 1.816 | 0.7290 | 93.23 | 83.26 | 43.05 |
| 126.0 | 1.835 | 0.7435 | 92.75 | 85.29 | 43.53 |
| 127.0 | 1.854 | 0.7581 | 92.22 | 87.32 | 44.00 |
| 128.0 | 1.873 | 0.7727 | 91.65 | 89.35 | 44.46 |
| 129.0 | 1.892 | 0.7874 | 91.04 | 91.40 | 44.93 |
| 130.0 | 1.911 | 0.8021 | 90.38 | 93.44 | 45.40 |
| 131.0 | 1.929 | 0.8168 | 89.68 | 95.49 | 45.86 |
| 132.0 | 1.948 | 0.8315 | 88.94 | 97.54 | 46.33 |
| 133.0 | 1.967 | 0.8463 | 88.15 | 99.59 | 46.79 |
| 134.0 | 1.985 | 0.8611 | 87.32 | 101.65 | 47.25 |
| 135.0 | 2.004 | 0.8759 | 86.44 | 103.70 | 47.71 |
| 136.0 | 2.022 | 0.8908 | 85.52 | 105.75 | 48.17 |
| 137.0 | 2.041 | 0.9056 | 84.55 | 107.79 | 48.63 |
| 138.0 | 2.059 | 0.9206 | 83.54 | 109.84 | 49.09 |
| 139.0 | 2.078 | 0.9355 | 82.49 | 111.88 | 49.54 |
| 140.0 | 2.096 | 0.9505 | 81.38 | 113.91 | 50.00 |

Each inner heater tube 40 will have identically shaped central portions 68, but these portions will be radially displaced from each other to form the inner array. Similarly outer heater tubes 40 have identically shaped central portions 68, but these portions will be radially displaced from the central portions of the other outer heater tubes to form the outer array.

Cone 46 is manufactured from a material, such as an alumina-based ceramic, which is highly reflective of solar radiation and able to withstand the extremely high temperatures within receiver chamber 50. The base of cone 46 fits closely inside the base of the conical frustrum shape formed by the central portions 68 of inner heater tubes 40. The radius of the base of cone 46 is therefore slightly smaller than $R_1$ minus the diameter of the inner heater tubes 40. The apex of cone 46 is typically located on the central axis 70 of the heater tube arrays so the energy reflected by the outer surface of cone 46 will have symmetric energy flux levels.

To convert the heat engine 14 to the "combustion" mode, aperture cover 62 is rotated from the "open" position where the receiver aperture 52 is open, to the "closed" position where the aperture cover is moved into engagement with receiver housing 48 and it covers and seals off receiver aperture 52. It is important that aperture cover 62 effectively seals off receiver aperture 52 is in the "closed" position to eliminate the loss of heated fluid through this opening when operating heat engine 14 in the "combustion" mode.

FIG. 2 shows the airflow within heater assembly 10 in the "combustion" mode. Fresh air 72 enters heater assembly 10 through air intake 54 and it then passes through heat exchanger 58 where it is warmed. The warmed fresh air is drawn to burner 60 where it is mixed with a fuel such as natural gas supplied by fuel supply 74 and burned. The combustion gases 76 produced by burning the fuel pass between outer heater tubes 42 and inner heater tubes 40 where a significant portion of the heat in the combustion gases is transferred to the working fluid circulating within heater tubes 40 and 42. Fan 18 assures that there is a pressure drop between the burner 60 and heater tubes 40 and 42. The combustion gases 76 then pass over heater tube head 44 and through heat exchanger 58 before being discharged through air exhaust 56 (shown in FIG. 1). Heat exchanger 58 retains heat in the system by lowering the temperature of the exhaust gas while raising the temperature of the fresh air entering the system. This substantially increases the overall thermal efficiency of the system.

In other embodiments of the inventive heater assembly 10, heated fluids other than combustion gases can be used to heat the heater tubes in the "combustion" mode. The combustion gases or other types of heated fluids could be produced remotely and then conveyed to heat engine 14 such as by piping or ductwork. The heated fluid could be a gas, a liquid, or a gas with an entrained liquid, such as saturated steam. In this way, the electrical generation unit 12 could be used to generate electricity from a source of heat that is currently being discharged to the environment.

In another embodiment of heater assembly 10, the receiver aperture 52 is covered by a transparent cover, such as a quartz lens, which allows solar energy to enter the receiver chamber 50 but prevents heated fluid from escaping through the receiver aperture. In this embodiment, an aperture cover is not required to seal off the receiver chamber to operate the heat engine 14 in the "combustion" mode. In this way it is possible to simultaneously utilize heat from both solar energy and a heated fluid to power heat engine 14, in effect giving heat engine 14 a "hybrid" operating mode. An aperture cover could be used with this embodiment to prevent inadvertent insolation of the heater tubes as well as to further insulate the receiver chamber to prevent the loss of heat through the lens when operating the heat engine 14 solely in the "combustion" mode.

While heat engine 14 is depicted as a Stirling cycle engine in FIGS. 1 and 2, it should be understood that the inventive heater assembly 10 can be used with other types of heat engines, such as Rankine Cycle engines.

It is to be understood that the invention is not limited to the exact construction illustrated and described above, but that various changes and modifications may be made without departing from the spirit and scope of the invention as defined in the following claims.

We claim:

1. A heat engine heater assembly for transferring heat to working fluid within said heater assembly from solar energy and combustion gases produced by burning a fuel, said heater assembly comprising:

a housing, forming a chamber, a plurality of heater tubes within said chamber, for containing the working fluid, wherein said heater tubes are positioned about a central axis and said heater tubes form a substantially opaque surface for incident solar radiation, said housing having an aperture allowing said heater tubes to be insolated, a fuel combustor, for mixing and burning air and fuel to produce combustion gases in said housing, air supply means for supplying air to said fuel combustor, fuel supply means for supplying fuel to said fuel combustor, combustion gas circulation means for circulating said combustion gases past said heater tubes, and sealing means for inhibiting said combustion gases from escaping said housing through said aperture.

2. A heater assembly according to claim 1 wherein said fuel combustor is located within said housing.

3. A heater assembly according to claim 2 wherein said heater tubes are positioned between said aperture and said fuel combustor.

4. A heater assembly according to claim 1 wherein said combustion gas circulation means includes a preheater that transfers heat from said combustion gases to said air after said combustion gases have circulated past said heater tubes.

5. A heater assembly according to claim 1 wherein said combustion gas circulation means includes pressure regulation means for creating a pressure drop from said fuel combustor to said heater tubes.

6. A heater assembly according to claim 1 wherein adjacent heater tubes have gaps therebetween allowing said combustion gases to circulate between said adjacent heater tubes.

7. A heater assembly according to claim 6 wherein said gaps between said adjacent heater tubes are substantially uniform.

8. A heater assembly according to claim 1 wherein said heater tubes form a modified inverted conical frustrum surface having a larger circular end, a smaller circular end and walls connecting said large circular end and said smaller circular end, said larger circular end positioned toward said aperture, said smaller circular end positioned away from said aperture, and said heater tubes forming said walls of said conical frustrum surface.

9. A heater assembly according to claim 8 wherein said larger circular end has a radius larger than the radius of said receiver aperture.

10. A heater assembly according to claim 8 wherein said smaller circular end has a radius smaller than the radius of said receiver aperture.

11. A heater assembly according to claim 1 further including a cone, fixed with respect to said heater tubes, said cone having an apex oriented toward said aperture, walls reflective of solar energy, and a base oriented away from said aperture, said heater tubes being evenly spaced about said base of said cone.

12. A heater assembly for transferring heat from solar energy and a heated fluid to working fluid that undergoes a thermodynamic cycle within a heat engine, such as a Stirling cycle engine, to produce mechanical output energy, said heater assembly comprising:

a housing, forming a chamber, a plurality of heater tubes within said chamber, for containing the working fluid, wherein said heater tubes are positioned about a central axis and said heater tubes form a substantially opaque surface for incident solar radiation, said housing having an aperture allowing said heater tubes to be insolated, heated fluid supply means for introducing heated fluid into said chamber, heated fluid circulation means for circulating the heated fluid past said heater tubes, and sealing means for inhibiting said heated fluid from escaping said housing through said aperture.

13. A heater assembly according to claim 12 wherein adjacent heater tubes have gaps therebetween and said gaps are uniform.

14. A heater assembly according to claim 12 wherein said heated fluid supply means includes a fuel combustor.

15. A heater assembly according to claim 12 wherein said heated fluid is circulated past said heater tubes in a direction generally toward said aperture.

16. A heater assembly according to claim 12 wherein said sealing means comprises an aperture cover, translatably connected to said housing, having an open and a closed position, said aperture cover sealing off said aperture in said closed position.

17. A heater assembly according to claim 12 wherein said heated fluid circulation means includes heat transfer means for transferring heat from said heated fluid after said heated fluid has circulated past said heater tubes to heated fluid to be introduced into said chamber by said heated fluid supply means.

18. A heat engine heater assembly for transferring heat to working fluid within said heater assembly from solar energy and combustion gases produced by burning a fuel, said heater assembly comprising:

a housing, forming a chamber, a plurality of heater tubes within said chamber, for containing the working fluid, said housing having an aperture allowing said heater tubes to be insolated, a fuel combustor, for mixing and burning air and fuel to produce combustion gases in said housing, air supply means for supplying air to said fuel combustor, fuel supply means for supplying fuel to said fuel combustor, combustion gas circulation means for circulating said combustion gases past said heater tubes, wherein said combustion gas circulation means includes pressure regulation means for creating a pressure drop from said fuel combustor to said heater tubes, and sealing means for inhibiting said combustion gases from escaping said housing through said aperture.

19. A heater assembly for transferring heat from solar energy and a heated fluid to working fluid that undergoes a thermodynamic cycle within a heat engine, such as a Stirling cycle engine, to produce mechanical output energy, said heater assembly comprising:

a housing, forming a chamber, a plurality of heater tubes within said chamber, for containing the working fluid, said housing having an aperture allowing said heater tubes to be insolated, heated fluid supply means for introducing heated fluid into said chamber, heated fluid circulation means for circulating the heated fluid past said heater tubes, and sealing means for inhibiting said heated fluid from escaping said housing through said aperture, wherein said sealing means comprises an aperture cover, translatably connected to said housing, having an open and a closed position, said aperture cover sealing off said aperture in said closed position.

* * * * *